United States Patent Office 3,328,319
Patented June 27, 1967

3,328,319
PROCESS FOR THE HARDENING OF EPOXIDE RESINS
Joachim Galinke, Dusseldorf-Holthausen, Günter Klement, Hilden, Rhineland, and Manfred Dohr, Dusseldorf-Holthausen, Germany, assignors to Henkel & Cie. G.m.b.H., Dusseldorf-Holthausen, Germany, a corporation of Germany
No Drawing. Filed Nov. 16, 1964, Ser. No. 411,613
Claims priority, application Germany, Dec. 21, 1963, H 51,198
9 Claims. (Cl. 260—2)

The present invention relates to a process for the hardening of epoxide resins with carboxylic acid anhydrides on addition of specific organic phosphorus compounds acting as hardening catalysts.

It is already known to add other substances to the molding mix of epoxide resins and di- or polycarboxylic acid anhydrides, which substances increase the rate of hardening. Such catalysts are for instance basic compounds, for example tertiary amines such as benzyldimethylamine, or sodium phenolate. Also, acid substances, for instance boron trifluoride, ferric trichloride tin tetrachloride and others are suitable. These known hardening catalysts, however, possess various disadvantages which make their utilization inadvisable. Thus, the tertiary amines have, most of them, a repugnant odor and are physiologically not without harm. Other catalysts named above frequently lead to a premature gelatinization of the batches prepared with the catalysts. Furthermore, many of the substances named in the preceding effect a discoloration of the hardened products.

Furthermore, salts of multivalent metals with acid organic phosphorus compounds, for example with phosphinic or phosphonic acids, also with neutral esters of phosphoric acid, have been suggested as hardening catalysts. However, the hardened epoxide resin products which are obtained from the utilization of these substances have physical properties such as heat stability and impact resistance which leave much to be desired.

An object of the present invention is the development of a process for the production of hardened epoxide resins which comprises heating at elevated temperatures a mixture comprising a hardenable epoxide resin, an acid anhydride selected from the group consisting of organic dicarboxylic acid anhydrides and organic polycarboxylic acid polyanhydrides and a catalytic amount of a phosphorus compound selected from the group consisting of I 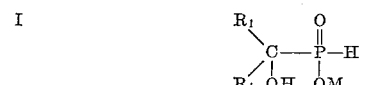

II 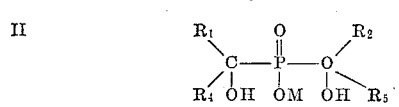

and
III 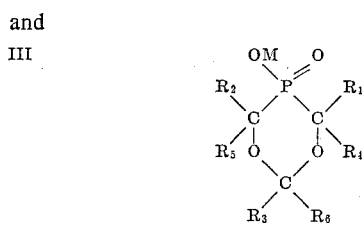

wherein M is selected from the group consisting of hydrogen and a monovalent cation, $R_1$, $R_2$, $R_3$, $R_4$, $R_5$ and $R_6$ represent a member selected from the group consisting of hydrogen, hydrocarbons and substituted hydrocarbons, for a time sufficient to harden said hardenable epoxide resin and recovering a hardened epoxide resin.

Another object of the present invention is the obtention of heat-hardenable epoxide resin compositions comprising a hardenable epoxide resin, an acid anhydride selected from the group consisting of organic dicarboxylic acid anhydrides and organic polycarboxylic acid polyanhydrides and a catalytic amount of a phosphorus compound selected from the group consisting of I 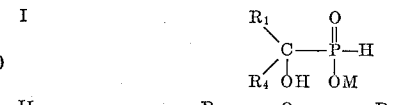

II 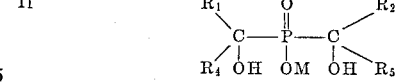

and
III 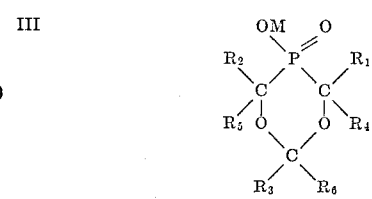

wherein M is selected from the group consisting of hydrogen and a monovalent cation, $R_1$, $R_2$, $R_3$, $R_4$, $R_5$ and $R_6$ represent a member selected from the group consisting of hydrogen, hydrocarbons and substituted hydrocarbons.

A yet further object of the invention is the development of an improvement in the hardening of heat-hardenable resins with acid anhydrides which comprises utilizing as hardening catalysts, a phosphorus compound selected from the group consisting of I 

II 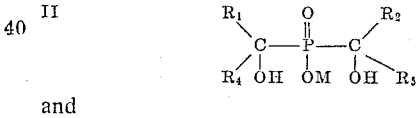

and
III 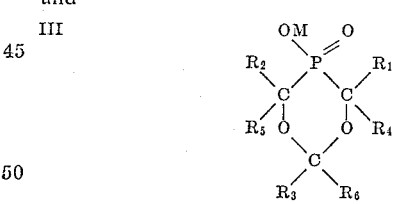

wherein M is selected from the group consisting of hydrogen and a monovalent cation, $R_1$, $R_2$, $R_3$, $R_4$, $R_5$ and $R_6$ represent a member selected from the group consisting of hydrogen, hydrocarbons and substituted hydrocarbons.

These and other objects of the invention will become more apparent as the description thereof proceeds.

Now an improved process for the hardening of the epoxide resins with di- or polycarboxylic acid anhydrides by addition of a hardening catalyst has been discovered. The new process yields satisfactory results without the occurrence of such disadvantages as cited above. It is characterized in that phosphorus compounds of the general formulae I 

II 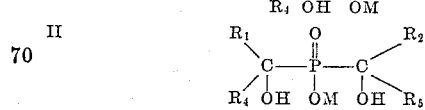

and

III 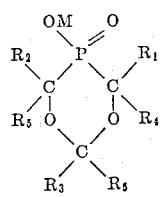

wherein M represents hydrogen or a monovalent cation, $R_1$ to $R_6$ represent hydrocarbons, either identical or different, substituted or not, are added to the mixtures of epoxide resins and acid anhydride hardeners. According to a preferred embodiment, $R_1$ to $R_3$ are hydrocarbons and $R_4$ to $R_6$ are hydrogen. Aliphatic, cycloaliphatic, aromatic or aliphatic-aromatic radicals may function as hydrocarbon or substituted hydrocarbon radicals which may be interrupted by heteroatoms or which may contain heteroatoms. Among the various hydrocarbons and substituted hydrocarbons present in the catalytic compounds of phosphorus under the designations of $R_1$ to $R_6$ are alkyl having from 1 to 18 carbon atoms such as methyl, propyl, isopropyl, butyl, etc.; halogenated alkyl such as trichloromethyl, etc.; alkenyl having from 3 to 18 carbon atoms such as allyl, etc.; cycloalkyl such as cyclohexyl, etc.; cycloalkenyl, such as 3-cyclohexenyl, etc.; aromatic hydrocarbons, such as phenyl, etc.; alkaryl hydrocarbons, such as benzyl, etc. In addition $R_1$ and $R_4$, $R_2$ and $R_5$ or $R_3$ and $R_6$ can, when taken together form a bridging alkylene group such as pentamethylene.

The hardening catalysts may be incorporated in the epoxide resin batches either singly or as a mixture.

The compounds mentioned above may be, for example, prepared in a simple manner from the reaction of hypophosphorous acid and aldehydes or ketones, the molar ratio being adapted to the desired products. Thus, for instance, α-hydroxy-phosphonic acids (Formula I, M=H) are obtained in a well known manner by the reaction of 1 mol of an aldehyde or ketone with 1 mol of hypophosphorous acid (Equation 1). Ketones, with the exception of acetone, yield the corresponding phosphonic acids, even when they are used in excess.

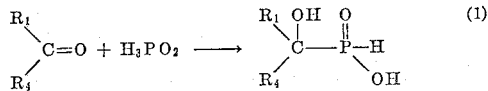

I

Symmetric bis-α-hydroxyphosphinic acids result from the reaction of 1 mol of hypophosphorous acid and 2 mols of aldehydes or acetone (Equation 2).

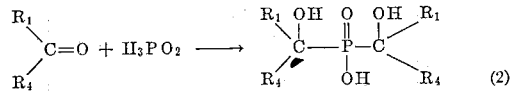

Asymmetric bis-α-hydroxyphosphinic acids may be, as it is readily evident, represented by the reaction of the phosphonic acids, obtainable according to Equation 1, with another aldehyde or acetone (Equation 3).

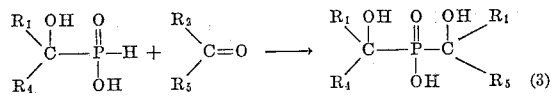

The acetalization of the bis-α-hydroxyphosphonic acids with a further molecule of aldehyde yields, under dehydrating conditions, acetals of the bis-α-hydroxyphosphinic acids (Equation 4).

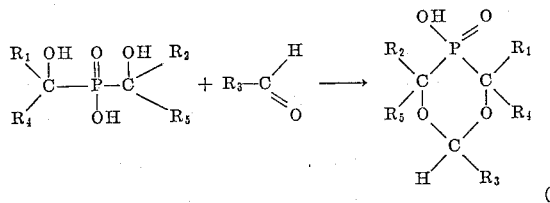

Symmetrical phosphinic acid-acetals, i.e. such, which are constructed of 3 molecules of the identical aldehydes and 1 molecule of $H_3PO_2$, may be prepared in a very elegant manner by direct reaction of 3 mols or more of an aldehyde with 1 mol of hypophosphorous acid, according to Equation 5.

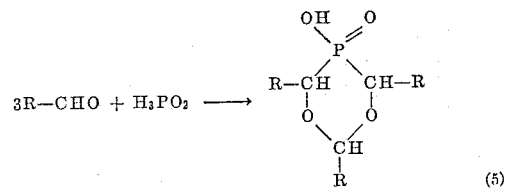

For the preparation of the compounds mentioned in the preceding, preferably aldehydes are used as starting substances. In this case reaction products result, where in the general Formulae I, II and III, given in the preceding, $R_1$ to $R_3$ represent hydrocarbons and $R_4$ to $R_6$ represent hydrogen.

Suitable agents for the process of the invention of the Formula I (M=H) are for instance α-hydroxyethyl-, α-hydroxybutyl-, α-hydroxyisobutyl-, α-hydroxyisoamyl-, α-hydroxytetrahydrobenzyl-, α-hydroxybenzyl-, α-hydroxy-β-trichloroethyl-phosphonic acids. While these substituted phosphonic acids may be derived from aldehydes by condensation with hypophosphoric acid, a ketone was used as a starting substance for the following: α-hydroxy-α-methyl-ethyl-, α-hydroxy-α-methyl-propyl-, α-hydroxy-cyclohexyl- and α-hydroxy-α-methyl-benzyl-phosphonic acids.

Effective hardening catalysts which correspond to the Formula II (M=H), are for instance bis-α-hydroxymethyl-, bis-α-hydroxybutyl-, bis-α-hydroxyisobutyl-, bis-α-hydroxybenzyl-, bis - α-hydroxy-β-trichloroethyl-phosphinic acid, also bis-α-hydroxy-α-methyl-ethyl-, α-hydroxymethyl-α'-hydroxybenzyl-, α-hydroxycyclohexyl-α'-hydroxycumyl-, α-hydroxyethyl-α'-hydroxy-α'-methyl-ethyl-, α-hydroxybutyl-α'-hydroxy-α'-methyl-propyl-phosphinic acid.

Representative agents of cyclic phosphinic acids, suitable as hardening catalysts which respond to the Formula III (M=H), are for example the benzaldehydeacetal or the cyclohexanoneketal of bis-α-hydroxy-benzyl-phosphinic acid, the cyclohexenealdehydeacetal of bis-α-hydroxytetrahydrobenzylphosphinic acid and the isobutyraldehyde acetal of bis-α-hydroxy-isobutylphosphinic acid, the benzaldehydeacetal of bis-α-hydroxy-butylphosphinic acid, the isobutyraldehydeacetal of α-hydroxymethyl-α'-hydroxybenzylphosphinic acid and the benzaldehydeacetal of the α - hydroxy-α-methyl-ethyl-α'-hydroxy-isobutyl-phosphinic acid.

In addition to the free acids of the Formulae I, II and III, their alkali- and ammonium salts or substituted ammonium salts represent important hardening catalysts. In these cases, M for instance may have the meaning of Li, Na, K, $NH_4^+$ or substituted ammonium such as $(HOC_2H_4)_3NH^+$ As a rule the hardening catalysts according to the invention are used in an amount of 0.01–20 percent by weight, especially 0.02–2 percent by weight, based on the resin-acidic hardener mixture. The amount of the addition of catalysts depends on various factors, for example on the nature of the resin and of the acidic hardening agent. Furthermore, the amount of the hardening catalyst to be used may be limited upwardly by its solubility in the epoxide resin-acidic hardener system. However, in some cases more than 20% of hardening catalysts may be used, when the free acids are employed. In these cases, however, the amount of di- or polycarboxylic acid anhydride will be advantageously reduced, as the free acid itself reacts with epoxide groups.

For the hardening processes catalyzed according to the meaning of the invention, the most varied hardenable epoxide compounds may be employed such as glycide ethers of multihydric phenols, as for example bisphenol A, or glycide ethers of novolaks (non-hardenable phenol resins), also glycidyl ethers of di- or polyols, as for example butanediol or glycerin, also glycide esters such as phthalic acid diglycide ester, iso- or terephthalic acid diglycide ester, adipic acid-diglycide ester as well as glycide esters of cyanuric acid or isocyanuric acid. Other suitable epoxide compounds are epoxified olefins and cyclo-olefins such as vinylcyclohexenedioxide, also compounds containing two or more epoxidized cyclohexene radicals per molecule, e.g. 3,4-epoxyhexahydro - 6 - methyltetrahydrobenzyl - 3′,4′ - epoxy-6′-methyl-hexahydrobenzoate or the diepoxide of the acetal of cyclohexene - aldehyde and 1,1 - dimethylolcyclohexene, finally epoxidized esters of unsaturated fatty acids with multihydric alcohols or epoxidized polybutadiene.

As acidic hardening agents the following may be used: for example, phthalic acid anhydride, maleic acid anhydride, glutaric acid anhydride, dodecylsuccinic acid anhydride, tetra- and hexahydrophthalic acid anhydride, methylhexahydrophthalic acid anhydride, endomethylenetetrahydrophthalic acid anhydride (so-called Nadic-anhydride), methylendomethylenehexahydrophthalic acid anhydride (so-called Nadic-methyl anhydride), pyromellitic acid dianhydride, trimelletic acid anhydride, dichloromaleic acid anhydride, tetrachlorophthalic acid anhydride, hexachloroendomethylenetetrahydrophthalic acid anhydride (so-called Het-anhydride), naphthalenedicarboxylic acid anhydride-1,8, polyadipic acid anhydride, polyazelaic acid anhydride, 3,6-epoxytetrahydrophthalic acid anhydride and others.

The molar ratio within which the various epoxide compounds are reacted with the anhydrides, are known to anyone skilled in the art and do not need to be changed in the hardening process catalyzed according to the invention.

The hardening temperature is, first of all, dependent on the properties of the acidic hardening agents and epoxide resins used. It is also known or it may be ascertained by simple tests. When hardening catalysts according to the invention are employed, the hardening, based on the accelerated hardening process, may be effected at temperatures somewhat lower than usually required for the respective resin-acidic hardener combination.

The working in of the catalysts into the resin-acidic hardener mixture does not cause any difficulties, as the acids as well as the salts dissolve very rapidly so that the most simplest way is to simultaneously melt and homogenize the epoxide compound, acidic hardener and catalyst. Of course, the catalysts may be added later to the hardenable resin-acidic hardener mixture. Also, the preparation of a premix of acidic hardeners and catalysts or of epoxide resins and catalysts is possible. These combinations may be stored and they do simplify the utilization of the invention.

The epoxide resin batches which are accelerated in their hardening according to the invention, are suitable for the preparation of shaped objects. Likewise from these mixes, a variety of overlays and films may be produced on a variety of substrates especially metallic substrates. For this purpose one may concurrently use solvents, and the lacquers thus obtained may be applied in well known manner with paint brushes, brushes, or by spraying or immersing. Furthermore, the mixes according to the invention may be utilized as cements, adhesives, in particular for metals, glass and other inflexible substances, or as seam-filling material between the various substances. The epoxide resin-acidic hardener catalyst mixes according to the invention are also suitable as casting resins and for the preparation of molded masses and as binding agents in the production of laminated materials and abrasives.

In the production of shaped objects, for example, the maximum Martens temperature is attained frequently after a short period of tempering, within 1–4 hours. Without the hardening catalysts according to the invention a considerable longer time is required which may frequently amount to 24–48 hours.

The following examples are illustrative of the invention. It is to be understood, however, that they place no limitations on the practice of the invention.

EXAMPLE 1

*Preparation of the hardening catalysts*

(A) PREPARATION OF α-HYDROXY TETRAHYDROBENZYLPHOSPHONIC ACID 264 gm. of 50% hypophosphorous acid were concentrated by azeotropic distillation with 100 cc. of benzene to a concentration of 85% $H_3PO_2$ in the aqueous phase. Subsequently, 110 gm. of cyclohexenealdehyde were added dropwise and under constant stirring at a temperature of 80° C. over a period of 2 hours. After a further reaction time of 2 hours at 80° C., the mixture was diluted with water. The benzene layer was separated and the aqueous phase was shaken five times with ethyl acetate. The collected ethyl acetate phases were dried over $Na_2SO_4$ and concentrated in vacuum to dryness. 124.4 gm. of α-hydroxytetrahydrobenzylphosphonic acid were obtained.

(B) PREPARATION OF BIS-α-HYDROXYBUTYLPHOSPHINIC ACID 288 gm. of n-butanal were heated with 132 gm. of $H_3PO_2$ (in form of an 85% aqueous solution) for a period of 20 hours at 80° C. The mixture was stirred until the reaction mass cooled and solidified (about 3 hours). The resultant solid crystal cake was broken into small pieces, suspended in water, vacuum filtered, washed with acetone and ether and then dried. 89 gm. of crystalline bis-α-hydroxybutylphosphinic acid were obtained having an acid number of 256.

(C) PREPARATION OF BIS-α-HYDROXYBENZYLPHOSPHINIC ACID 106 gm. of benzaldehyde was reacted with 33 gm. of $H_3PO_2$ (85%) for a period of 7.5 hours in the same manner as described in Example I–B. 38.8 gm. of bis-α-hydroxybenzylphosphinic acid were obtained having an acid number of 186.

(D) PREPARATION OF THE 3-CYCLOHEXENEALDEHYDE ACETAL OF BIS-α-HYDROXYTETRAHYDROBENZYLPHOSPHINIC ACID 660 gm. of 3-cyclohexenealdehyde and 158 gm. of 86% hypophosphorus acid were reacted together for a period of 20 hours, as in Example I–B. 577 gm. of the 3-cyclohexenealdehyde acetal of bis-α-hydroxytetrahydrobenzylphosphinic acid resulted therefrom having an acid number of 149 and an iodine number of 199.

(E) PREPARATION OF THE 3-CYCLOHEXENEALDEHYDE ACETAL OF BIS-α-HYDROXYTETRAHYDROBENZYLPHOSPHINIC ACID 990 gm. of 3-cyclohexenealdehyde were admixed with 800 cc. of benzene and heated to the boiling point. 396 gm. of a 50% aqueous hypophosphorous acid solution were added dropwise while stirring over a period of 3.5 hours. The water, distilled azeotropically with the benzene, was collected in a water trap. After a total of 5 hours of distillation, the water elimination was completed and 245 cc. of water (calculated 252 cc.) were recovered. Subsequently 450 cc. of benzene were distilled thereoff. The crystal mass obtained was suspended in 1000 cc. of light benzine, filtered with suction, washed with light benzine and dried. 1070 gm. of cyclohexenealdehyde acetal of bis-α-hydroxyetetrahydrobenzylphosphinic acid were obtained having an acid number of 147 and an iodine number of 202.

(F) PREPARATION OF THE ISOBUTANAL ACETAL OF BIS-α-HYDROXYISOBUTYLPHOSPHINIC ACID 432 gm. of isobutanal in 400 cc. benzene were reacted with 264 gm. of 50% hypophosphorous acid solution as described in Example I–E. 356 gm. of the isobutyraldehyde acetal of bis-α-hydroxyisobutylphosphinic acid were obtained having an acid number of 202.

(G) PREPARATION OF THE BENZALDEHYDE ACETAL OF BIS-α-HYDROXYBENZYLPHOSPHINIC ACID

Following the reaction steps described in Example I–E by utilizing 139 gm. of benzaldehyde in 200 cc. of toluene and 66 gm. of 50% hypophosphorous acid solution, 153.3 gm. of the benzaldehyde acetal of bis-α-hydroxybenzylphosphinic acid were obtained having an acid number of 159.5.

EXAMPLE II

Preparation of salts

From the acids prepared as described in preceding Example I, the corresponding salts were prepared according to the following process. The phosphorus-containing acids were dissolved or suspended in aqueous methanol or ethanol and then admixed with the calculated amount of an alkali metal hydroxide or of the desired amines. The products may be purified by concentrating a solution thereof and re-precipitating or recrystallizing the salts obtained. Following the above process, the following salts were prepared. The sodium salt of α-hydroxytetrahydrobenzylphosphonic acid, the lithium, sodium, potassium and triethanolamine salts of the cyclohexenealdehyde acetal of bis-α-hydroxy-tetra-hydrobenzylphosphonic acid and the lithium and potassium salts of bis-α-hydroxybenzylphosphinic acid.

The following examples describe the compositions and hardening of molding mixes of the invention.

EXAMPLE III

Comparative test of setting and hardening (a) The hardening of a commercial diglycide ether prepared from diphenylolpropane and epichlorohydrin (equivalent weight of epoxide=195) with phthalic acid anhydride without any addition.

39 gm. of the above commercial diglycide ether and 29.6 gm. of phthalic acid anhydride were melted at a temperature of 120° C., homogenized and cast into standard rods (120 x 15 x 10 mm). The test samples were hardened for a period of either 15 or 91 hours at 150° C. and then stored for 24 hours at room temperature. Next, they were tested according to appearance, hardness (ball pressure hardness according to DIN 7707) and heat stability according to Martens (DIN 53 458).

TABLE I

| | | |
|---|---|---|
| Hardening time | 15 hours | 91 hours. |
| Hardening temperature | 150° C | 150° C. |
| Appearance | Clear | Clear. |
| Martens number | 120° C | 125° C. |
| Hardness (kg./cm.²) | 1,590 | 1,590. |

In the same manner all of the standard rods mentioned in the following examples were produced and tested.

(b) Prior to the hardening process the following catalysts were worked into the mixture of epoxide resin and phthalic acid anhydride prepared according to Example IIIa:

(a) Sodium salt of α-hydroxytetrahydrobenzylphosphonic acid (b) Sodium salt of the cyclohexenealdehyde acetal of bis-α-hydroxytetrahydrobenzylphosphinic acid.

Hardening: 3.5 hours at 120° C. and 15 hours at 150° C.

Table II illustrates the results.

TABLE II

| Catalyst | (a) | (a) | (b) |
|---|---|---|---|
| Amount | 1.1% | 0.14% | 1.2% |
| Gel time [1] | 10 minutes | 30 minutes | Circa 2 hours. |
| Appearance | Slightly cloudy | Clear | Slightly cloudy. |
| Martens No | 137° | 144° | 142°. |
| Hardness No | 910 | 880 | 1,590. |
| Post-hardening: 24 hours at 200° C. | | | |
| Martens No | 142° | 143° | 153°. |

[1] Time from the filling of the mold up to the transition of the batch into the gel stage.

EXAMPLE IV (A) The casting resin mixture described in Example IIIa was hardened with the following additions:

(a) Potassium salt of the cyclohexenaldehyde acetal of bis-α-hydroxy-tetrahydrobenzylphosphinic acid (b) Potassium salt of bis-α-hydroxybenzylphosphinic acid Hardening: 3.5 hours at 120° C. and 15 hours at 150° C.

Table III illustrates the results.

TABLE III

| Catalyst | (a) | (a) | (a) | (b) | (b) | (b) |
|---|---|---|---|---|---|---|
| Amount | 1% | 0.5% | 0.2% | 1% | 0.5% | 0.2% |
| Gel time | 25 min | 40 min | 75 min | 25 min | 40 min | 60 min. |
| Appearance | (¹) | (¹) | Clear | (¹) | (¹) | Clear. |
| Martens No | 143° | 150° | 142° | 144° | 146° | 146°. |
| Hardness No | 1,515 | 1,515 | 1,590 | 1,515 | 1,515 | 1,590. |
| Post-hardening: 24 hours at 200° C. | | | | | | |
| Martens No | 143° | 145° | 142° | 146° | 148° | 151°. |

[1] Some larger particles of the salt had not been dissolved.

(B) Standard rods were cast from the same casting resin mixture as in Example IIIa, with the following catalysts:

(a) no catalyst
(b) the mixture with the addition of 0.2% of the potassium salt of bis-α-hydroxybenzylphosphinic acid, and
(c) the mixture with addition of 2% of the potassium salt of bis-α-hydroxybenzylphosphinic acid.

All samples were prepared simultaneously, heated for a period of 3.5 hours at 120° C. and then subjected in pairs to hardening periods of various lengths at a temperature of 150° C.

TABLE IV

| Hardening Time | 5 hours | | | 10 hours | | | 15 hours | | |
|---|---|---|---|---|---|---|---|---|---|
| Catalysts | (a) | (b) | (c) | (a) | (b) | (c) | (a) | (b) | (c) |
| Martens No., deg | 105 | 126 | 128 | 113 | 127 | 152 | 122 | 134 | 147 |
| Hardness No | 1,350 | 1,450 | 1,515 | 1,390 | 1,590 | 1,590 | 1,425 | 1,520 | 1,590 |

All cast rods were clear and of light color.

EXAMPLE V

Cast rods were produced according to Example IIIa while using the following catalyst additions:

(a) The lithium salt of the cyclohexenaldehyde acetal of bis-α-hydroxytetrahydrobenzylphosphinic acid, and
(b) The lithium salt of bis-α-hydroxybenzylphosphinic acid.

TABLE V

| Catalyst | (a) | (a) | (a) | (b) | (b) | (b) |
|---|---|---|---|---|---|---|
| Amount | 1% | 0.5% | 0.2% | 1% | 0.5% | 0.2% |
| Gel time | 80 min. | 3 hrs. | 3 hrs. | 2 hrs. | 2 hrs. 40 min. | 3 hrs. 10 min. |
| Martens No | 127° | 127° | 114° | 129° | 128° | 125°. |
| Hardness No | 1,590 | 1,590 | 1,590 | 1,515 | 1,515 | 1,515. |

| Post-hardening: 24 hours at 200° C. | | | | | | |
|---|---|---|---|---|---|---|
| Martens No | 135° | 138° | 133° | 132° | 137° | 125°. |

EXAMPLE VI

The resin-acidic hardener mixture described in Example IIIa was hardened with an addition of 0.5% of the triethanolamine salt of the cyclohexenaldehyde acetal of bis-α-hydroxytetrahydrobenzylphosphinic acid. The following test results were obtained:

Hardening _____ 3.5 hours at 210° C. and 15 hours at 150° C.
Gel time _____ 30 minutes.
Appearance _____ Light, clear.
Martens No. _____ 131° C.
Hardness No. _____ 1515.

EXAMPLE VII

A casting resin mixture was prepared from 190 gm. of an epoxide resin based on epoxidized cyclohexene derivatives (commercial product "Unox 201," 3,4-epoxy-6-methyl-cyclohexylmethyl 3,4 - epoxy-6-methyl - hexahydrobenzoate) containing 10.9% epoxide oxygen and 118 gm. of phthalic acid anhydride. This mixture was divided and part of the mixture was catalyzed with 0.2% of the potassium salt of bis-α-hydroxybenzylphosphinic acid, based on the total weight of resin and acidic hardener. A homogeneous melted mass resulted from the melting process in both samples.

Hardening of test 1: 5 hours at 140° C.
Hardening of test 2: 5 hours at 140° C. and 5 hours at 160° C.
Hardening of test 3: 5 hours at 140° C. and 10 hours at 160° C.

TABLE VI

| Catalyst | Test 1 | | Test 2 | | Test 3 | |
|---|---|---|---|---|---|---|
| | 0 | 0:2% | 0 | 0:2% | 0 | 0:2% |
| Martens No., deg | | 141 | 55 | 152 | 62 | 174 |
| Hardness No | | 1,515 | 1,270 | 1,590 | 1,515 | 1,590 |

All of the standard rods had a clear appearance, the sample hardened at 140°, was substantially lighter than the others. The gel time was shortened to 10 minutes in the catalyst containing samples.

EXAMPLE VIII

The process of Example VII was repeated and modified in that in place of the potassium salt of bis-α-hydroxybenzylphosphinic acid, 1% of the tetrahydrobenzaldehyde acetal of bis-α-hydroxytetrahydrobenzylphosphinic acid was added. The standard rods were subjected, as in Example VII, in pairs to hardening at 140° C. After a hardening period of 10 hours, the sample without the catalyst was still very soft (hardness number=640), whereas the sample which had been hardened with the catalyst had a Martens number of 47° C. and had a hardness number of 1330. After a period of 15 hours of hardening at 140° C., the respective values were as follows:

Without catalyst: Martens number 47° C., hardness number: 1030
With catalyst: Martens number 61° C., hardness number 1330

The preceding specific embodiments are illustrative of the invention. It is to be understood that other expedients known to those skilled in the art may be employed with-

We claim:
1. A process for the production of hardened epoxide resins which comprises heating at elevated temperatures a mixture comprising an epoxide resin hardenable with carboxylic acid anhydrides, an acid anhydride selected from the group consisting of organic dicarboxylic acid anhydrides and organic polycarboxylic acid polyanhydrides and from 0.01% to 20% by weight, based on the resin-anhydride mixture of a phosphorus compound selected from the group consisting of

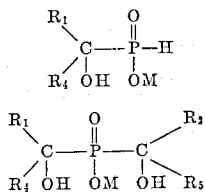

and

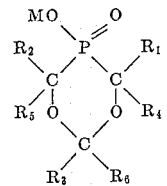

wherein M is selected from the group consisting of hydrogen, alkali metal, ammonium and substituted ammonium, $R_1$, $R_2$, $R_3$, $R_4$, $R_5$ and $R_6$ represent a member selected from the group consisting of hydrogen, hydrocarbons and substituted hydrocarbons, for a time sufficient to harden said epoxide resin and recovering a hardened epoxide resin.

2. A process for the production of hardened epoxide resins which comprises heating at elevated temperatures a mixture comprising an epoxide resin hardenable with carboxylic acid anhydrides, an acid anhydride selected from the group consisting of organic dicarboxylic acid anhydrides and organic polycarboxylic acid polyanhydrides and from 0.01 to 20% by weight, based on the resin-anhydride mixture of a phosphorus compound selected from the group consisting of

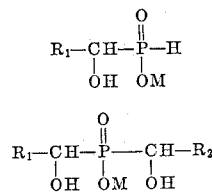

and

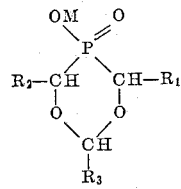

wherein M is selected from the group consisting of hydrogen, alkali metal, ammonium and substituted ammonium, and $R_1$, $R_2$ and $R_3$ represent hydrocarbons, for a time sufficient to harden said epoxide resin and recovering a hardened epoxide resin.

3. The process of claim 2 wherein said phosphorus compound is present in an amount of from 0.02% to 2% by weight, based on the weight of said epoxide resin and said acid anhydride.

4. A heat-hardenable epoxide resin composition comprising an epoxide resin hardenable with carboxylic acid anhydrides, an acid anhydride selected from the group consisting of organic dicarboxylic acid anhydrides and organic polycarboxylic acid polyanhydrides and from 0.01% to 20% by weight, based on the resin-anhydride mixture of a phosphorus compound selected from the group consisting of

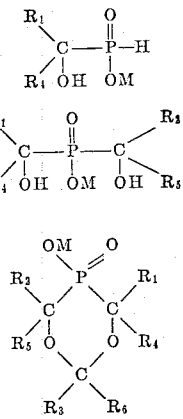

wherein M is selected from the group consisting of hydrogen, alkali metal, ammonium and substituted ammonium, $R_1$, $R_2$, $R_3$, $R_4$, $R_5$ and $R_6$ represent a member selected from the group consisting of hydrogen, hydrocarbons and substituted hydrocarbons.

5. A heat-hardenable epoxide resin composition comprising an epoxide resin hardenable with carboxylic acid anhydrides, an acid anhydride selected from the group consisting of organic dicarboxylic acid anhydrides and organic polycarboxylic acid polyanhydrides and from 0.01% to 20% by weight, based on the resin-anhydride mixture of a phosphorus compound selected from the group consisting of

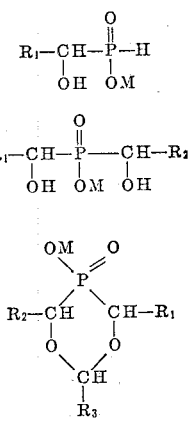

wherein M is selected from the group consisting of hydrogen, alkali metal, ammonium and substituted ammonium, and $R_1$, $R_2$ and $R_3$ represent hydrocarbons.

6. The composition of claim 5 wherein said phosphorus compound is present in an amount of from 0.02% to 2% by weight, based on the weight of said epoxide resin and said acid anhydride.

7. In the process of hardening epoxide resins by heating at elevated temperatures a mixture comprising an epoxide resin hardenable with carboxylic acid anhydrides, an acid anhydride selected from the group consisting of organic dicarboxylic acid anhydrides and organic polycarboxylic acid polyanhydrides and a catalyst for a time sufficient to harden said epoxide resin and recovering a hardened epoxide resin, the improvement which comprises utilizing as said catalyst from 0.01% to 20% by weight, based on the weight of said mixture of a phosphorus compound selected from the group consisting of

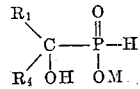

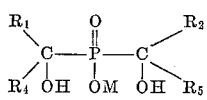

and

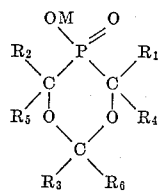

wherein M is selected from the group consisting of hydrogen, alkali metal, ammonium and substituted ammonium, $R_1$, $R_2$, $R_3$, $R_4$, $R_5$ and $R_6$ represent a member selected from the group consisting of hydrogen, hydrocarbons and substituted hydrocarbons.

8. Hardened molded resinous articles produced from an epoxide resin hardenable with carboxylic acid anhydrides, an acid anhydride selected from the group consisting of organic dicarboxylic acid anhydrides and organic polycarboxylic acid polyanhydrides and from 0.01% to 20% by weight, based on the weight of the resin and the anhydride of a phosphorus compound selected from the group consisting of

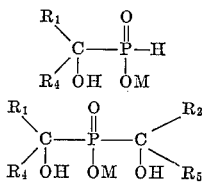

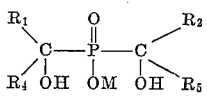

and

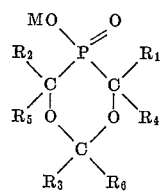

wherein M is selected from the group consisting of hydrogen, alkali metal, ammonium and substituted ammonium, $R_1$, $R_2$, $R_3$, $R_4$, $R_5$ and $R_6$ represent a member selected from the group consisting of hydrogen, hydrocarbons and substituted hydrocarbons.

9. Hardened molded resinous articles produced from an epoxide resin hardenable with carboxylic acid anhydrides, an acid anhydride selected from the group consisting of organic dicarboxylic acid anhydrides and organic polycarboxylic acid polyanhydrides and from 0.01% to 20% by weight, based on the weight of the resin and the anhydride of a phosphorus compound selected from the group consisting of

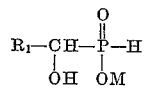

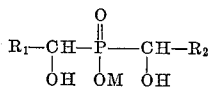

and

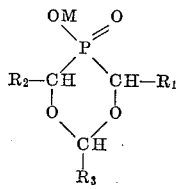

wherein M is selected from the group consisting of hydrogen, alkali metal, ammonium and substituted ammonium, and $R_1$, $R_2$ and $R_3$ represent hydrocarbons.

References Cited
UNITED STATES PATENTS

| | | | |
|---|---|---|---|
| 2,752,269 | 6/1956 | Condo et al. | 260—47 |
| 3,159,537 | 12/1964 | Takesue et al. | 260—500 |

FOREIGN PATENTS

| | | |
|---|---|---|
| 1,024,709 | 2/1958 | Germany. |

WILLIAM H. SHORT, *Primary Examiner.*

T. PERTILLA, *Assistant Examiner.*